July 12, 1949. G. L. MOORE 2,475,851
RELIEF VALVE
Original Filed May 24, 1943

Inventor
George L. Moore
By George R. Ericson
Attorney

Patented July 12, 1949

2,475,851

UNITED STATES PATENT OFFICE 2,475,851

RELIEF VALVE

George L. Moore, Detroit, Mich.

Original application May 24, 1943, Serial No. 488,287, now Patent No. 2,439,053, dated April 6, 1948. Divided and this application September 25, 1944, Serial No. 555,608

2 Claims. (Cl. 137—53)

This invention relates to relief valves and particularly to a new form of synthetic rubber valve which can be used for many different purposes.

This application is a division of my copending application Serial No. 488,287 filed May 24, 1943, now Patent No. 2,439,053 issued April 6, 1948 for Lubricating devices.

An object of the invention is to provide a relief valve suitable for use at excessive pressures and which when in use may be capable of operating as a visible indicator.

A further object of the invention is to provide a relief valve for a pressure container of such a character that the pressure container may be filled to high pressure and the valve will function to automatically relieve the pressure fluid, the escape thereof affording a visual indication that the fluid has reached said high pressure and/or that the container has been filled to capacity.

It is another object of the invention to produce a relief valve for grease cup of the character described which is not subject to breakage as a result of too much pressure.

The invention will be better understood upon reference to the following description and accompanying drawings, referring to which Figure 1 is a sectional elevation of the grease cup.

Figure 1:
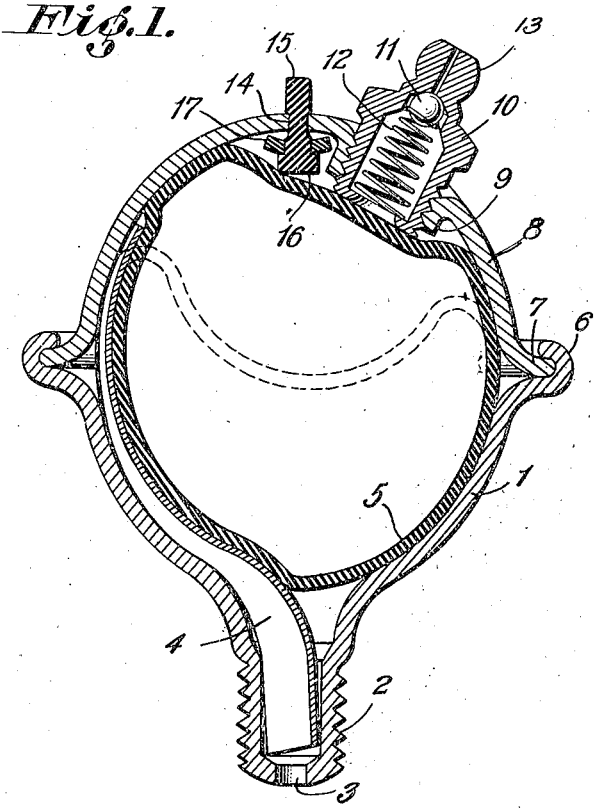
Figure 2:
Figure 2 is an elevation of the discharge trough.
Figure 3:
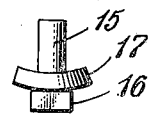
Figure 3 is an elevation of the relief valve.

Referring to the drawings, the reference numeral 1 indicates the lower half of the body member which is formed in semi-spherical shape from sheet metal and provided with a screw threaded extension 2 which serves to mount the cup on the bearing which is to be lubricated. This extension is provided with an outlet 3 and is internally formed to receive the lower end of the trough 4 which serves to prevent the outlet from being blocked by the pressure member or ball 5.

Figure 4:
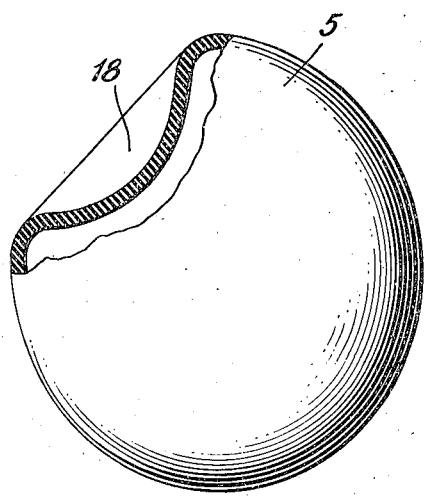
Figure 4 shows a ball which is used as a pressure element.

The ball member 5 is formed of synthetic rubber or other material capable of containing air under pressure without leakage and withstanding the action of the lubricant. An important feature of my invention is that the ball is originally formed with air under subatmospheric pressure, so that, when exposed to ordinary atmospheric pressure and at a temperature of approximately 70° F., the ball is partially collapsed, as indicated by the dimple 18 in Figure 4. This construction and pressure condition may be produced by molding the ball in a hot mold with only atmospheric pressure or comparatively low superatmospheric pressure, so that when the ball cools after molding, the air contracts and produces the dimple 18 in the side of the ball.

The upper part of the body member 1 is formed with a flange 6 which is crimped over the outstanding flange 7 of the upper body member 8, which is also formed from sheet metal with an internal extending screw threaded portion 9 to receive the grease gun fitting 10. This fitting is provided with an inwardly opening check valve 11 normally held in closed position by a spring 12. The fitting is provided with any suitable grease gun attaching surface, such as the spherical portion 13. The cup is adapted to be filled through this grease gun fitting in a well understood manner. The upper body member 8 is provided with an opening 14, which receives the rubber relief valve member 15 which is headed at 16. The head is kept from sealing the opening 14 by means of a bent metal washer 17.

In operation, the cup is attached to the bearing which is to be lubricated by means of the screw threaded portion 2 and filled by means of a pressure grease gun. The ball 5 contains air, originally under subatmospheric pressure, but which is compressed by means of the grease entering the nipple 13. The spherical shape of the receptacle 1—8 permits the application of very high pressure without breakage, so that the operator can tell by the feel of the grease gun when the cup is full, but I prefer to provide the additional visual indicator and relief valve 15 which, under the application of extreme pressure, compresses at the opening 14, permitting the passage of some grease under the washer 17 and out through the opening 14 past the stem of the plug. The escape of grease in this manner gives a visual indication that the cup is full.

Grease cups of this type are normally filled at predetermined intervals, and the cup is designed and calibrated to discharge gradually throughout this period with a decreasing pressure until approximately ½ or ⅓ of the grease is gone. In case the operator forgets to fill the cup at this time, the feeding of grease continues, but at a rapidly decreasing rate on account of the relief of pressure on the air in the ball, which progresses geometrically until the cup produces an empty condition, but does not completely empty the cup or discontinue the supply until several times the normal period between refillings has elapsed. In this way, the life of the bearings, which are lubricated by the cup, is protected, as most bearings will continue to operate without damage as long as the supply of lubricant is continued, even though the rate of supply may greatly decrease below normal.

An important feature of the operation of this invention is in the fact that the dimple 18 still contains a supply of grease after the cup has been discharged to a point that the pressure within the ball is at or below atmospheric under normal temperature conditions. This provides for a reserve supply to be discharged in case the bearing should become overheated, which would result in communication of heat to the air inside the ball and consequent expansion thereof, resulting in a further discharge of lubricant to the bearing to meet the emergency.

The foregoing description and accompanying drawings are intended to be illustrative and not limiting, and the use of all such modifications as come within the scope of the appended claims is contemplated.

I claim:

1. A relief valve comprising a perforated member and a compressible plug normally filling and sealing said perforation, said plug having a head portion at one end thereof, and means spacing said head portion from the perforation whereby sealing of the perforation by said head is prevented.

2. A relief valve comprising a member having a passageway therein, and a compressible plug normally filling and sealing said passageway, said plug having an enlarged head portion at one end thereof, and means for preventing said head portion from sealing the passageway, said means comprising a non-flexible washer between the head of the plug and the said member.

GEORGE L. MOORE.

REFERENCES CITED

The following references are of record in the file of this patent:

UNITED STATES PATENTS

| Number | Name | Date |
|---|---|---|
| 201,880 | Johnson | Apr. 2, 1878 |
| 481,762 | Ives | Aug. 30, 1892 |
| 612,570 | Pickett | Oct. 18, 1898 |
| 2,044,836 | Crowley | June 23, 1936 |